United States Patent [19]
Schwietert

[11] Patent Number: 5,902,481
[45] Date of Patent: May 11, 1999

[54] STRAINER FOR DRAINING LIQUID-PACKED CANNED GOODS

[76] Inventor: Clinton L. Schwietert, 4620 N. Gove, Tacoma, Wash. 98407

[21] Appl. No.: 08/688,992

[22] Filed: Aug. 1, 1996

[51] Int. Cl.$^6$ ........................................................ B30B 9/06
[52] U.S. Cl. ........................ 210/464; 210/470; 210/471; 210/474; 210/478; 99/495; 99/505; 99/508; 99/510; 100/113; 100/116
[58] Field of Search .................................... 100/113, 116, 100/110; 99/495, 508, 505, 510; 210/469, 464, 470, 471, 474, 478

[56] References Cited

U.S. PATENT DOCUMENTS

| | | |
|---|---|---|
| D. 105,367 | 7/1937 | Swordling . |
| 1,048,546 | 12/1912 | Ketcham . |
| 1,669,284 | 5/1928 | Chetham . |
| 3,995,544 | 12/1976 | Farley ..................................... 210/464 |
| 4,040,964 | 8/1977 | Hegyi ..................................... 210/470 |
| 5,320,031 | 6/1994 | Whitney ..................................... 99/495 |
| 5,372,063 | 12/1994 | Berg ..................................... 100/110 |
| 5,501,144 | 3/1996 | Bryson ..................................... 210/464 |
| 5,706,721 | 1/1998 | Homes ..................................... 210/464 |

*Primary Examiner*—David A. Reifsnyder
*Attorney, Agent, or Firm*—John R. Benefiel

[57] ABSTRACT

A strainer device for assisting in draining packing liquid from opened tuna fish cans, as well as from opened cans of produce such as vegetables, fruit, and beans, the device including a molded plastic short hollow cylinder open at the top end and closed at the bottom end with a perforated bottom wall, the strainer body sized to be slidably fit into an opened tuna fish can. A pair of flange ears at the top enable the bottom each to be pushed into the tuna to force the liquid out through the bottom wall perforations as well as a series of slots around the perimeter. The bottom wall bulges down to be convexly shaped, aiding in moving the liquid out through the slots and also allows an inverted open can of produce to drain through the perforations as the strainer is resting on a supporting surface.

11 Claims, 3 Drawing Sheets

STRAINER FOR DRAINING LIQUID-PACKED CANNED GOODS

BACKGOUND OF THE INVENTION

This invention concerns strainers or colanders and more particularly strainers for draining the liquid from cans containing liquid-packed food such as produce or tuna fish. It is often desired to drain the liquid for further preparation of the food packed in the liquid.

There has been previously devised press-strainers for draining the oil or water from cans of tuna fish. See for example U. S. Design Patent No. 366,189 issued on Jan. 16, 1996 for a "Draining Press for Canned Goods." The device shown in that patent uses separate members hinged together to form a press.

The object of the present invention is to provide a simple strainer which is conveniently useable to drain the liquid from canned goods of a variety of can sizes, as well as to enable pressing and draining of the liquid in which canned tuna is packed

SUMMARY OF THE INVENTION

The above object and others, which will become apparent upon a reading of the following specification and claims, are achieved by an open-topped hollow cylindrical strainer body which is of relatively short height, less than that of a standard tuna fish can, and has a perforated bottom wall closing off its bottom end.

A flange extends around the rim of the open top end with a pair of enlarged flange ears located across from each other on either side of the rim.

The perforated closed bottom of the strainer body is bulged downwardly to be convexly shaped, and a series of through slots are formed around the strainer body wall extending into the bottom wall.

The device can be used as a press by forcing the convex bottom of the strainer body into an opened can of tuna, using the thumbs engaging the flange ears and the fingers to hold the inverted tuna can. The outer diameter of the strainer body is dimensioned to slidably fit into the tuna can to compress the tuna meat and expel the liquid, but a ridge on the outer diameter limits the pressing movement into the tuna can, with the packing liquid forced out of the tuna meat, draining out through the slots and bottom wall perforations.

A series of protrusions are formed on the flange ears to reduce the tendency of the fingers or thumbs to slip from the flange ears.

An opened can of produce such as fruit, vegetables, or beans can be drained by inverting the strainer to allow placing the convex bottom of the device on a surface after first putting the strainer body into the opened end of the can, allowing the packing liquid to drain through the perforations and slots onto the supporting surface.

A stepped diameter allows a larger size of can to be supported within the strainer body spaced above the bottom wall.

DETAILED DESCRIPTION

Figure 1:
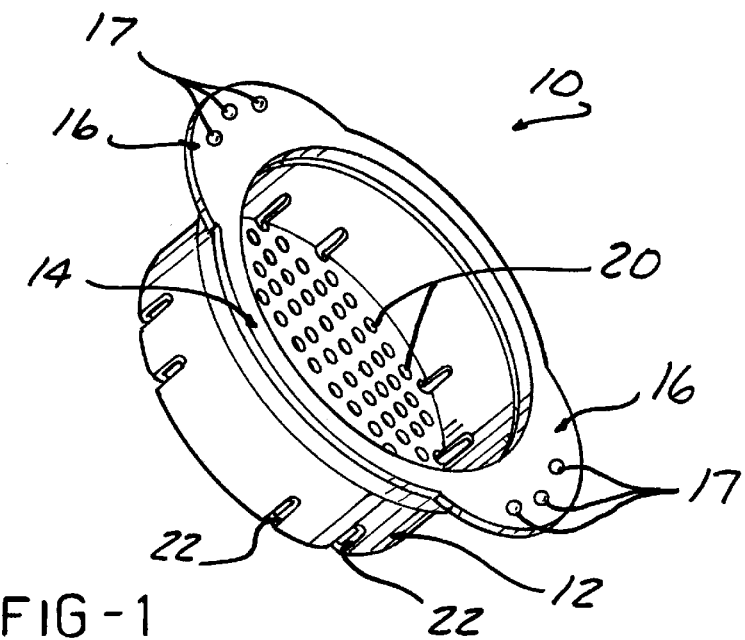
FIG. 1 is a perspective view of a strainer according to the present invention.
Figure 2:
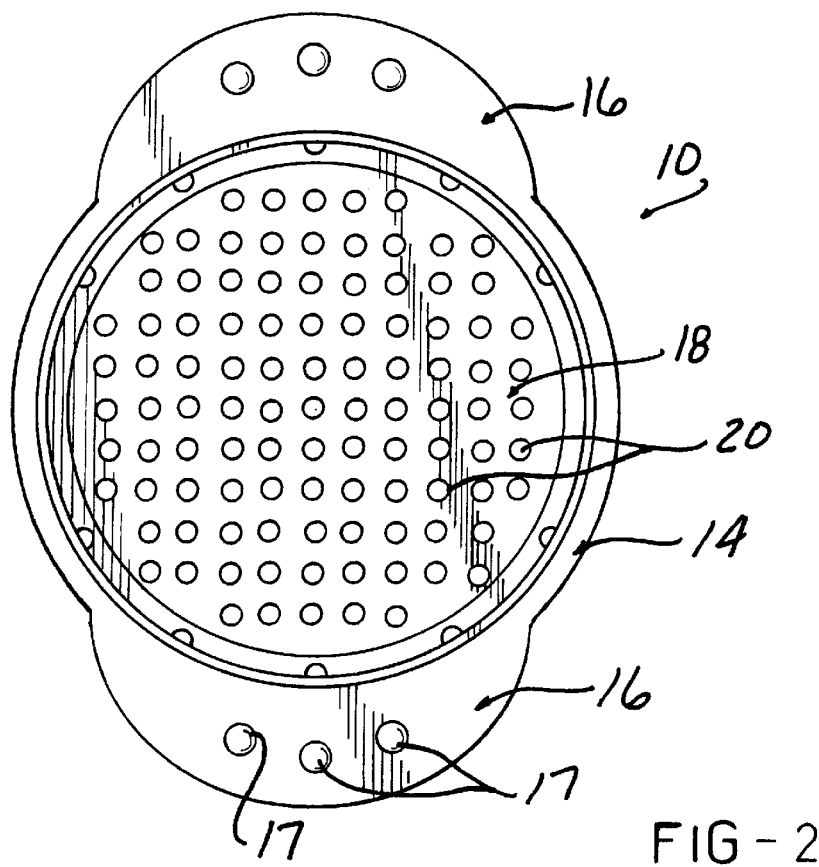
FIG. 2 is a top view of the strainer shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1–6, the strainer 10 comprises a molded plastic strainer body 12 configured as an open-topped hollow cylinder of short height relative to its diameter.

A flange 14 extends around the rim of the open top of the body 12, which enlarges to form a pair of flange ears 16 located across from each other on opposite sides of the body 12. The top of the flange ears 16 has a series of protrusions or bumps 17 acting as an antislip feature to improve the ability of a user to maintain engagement of the flange ears 16 with his or her thumb or finger when used to drain tuna cans, as will be described.

A ridge 15 on the underside also stiffens the flange ears 16.

Figure 3:
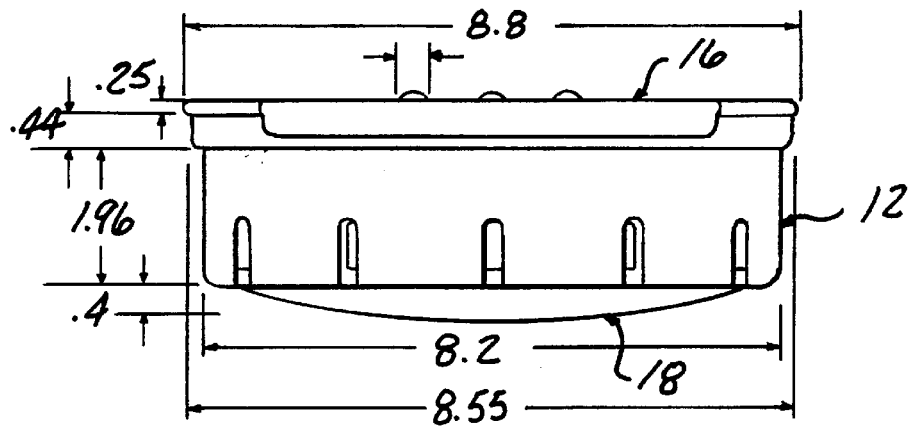
FIG. 3 is a dimensioned side elevational view of the strainer shown in FIGS. 1 and 2.
Figure 6:
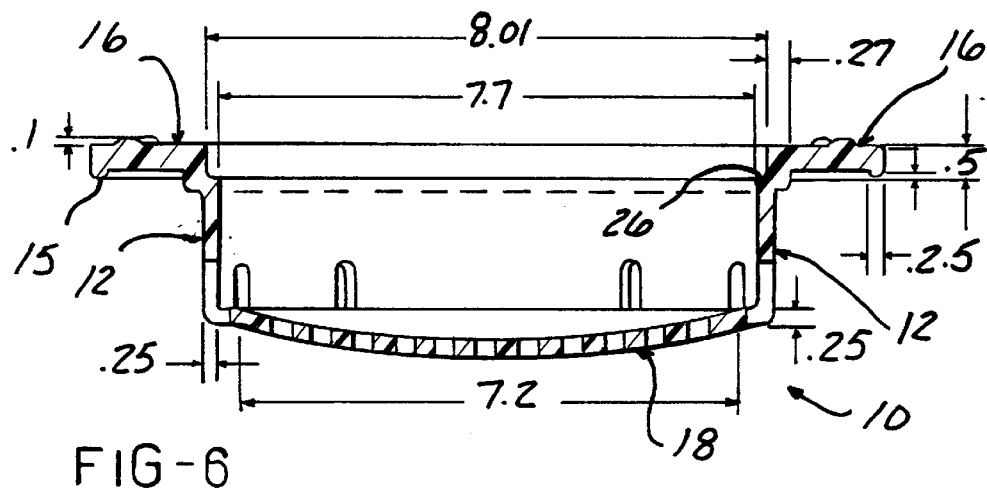
FIG. 6 is a transverse sectional view of the strainer shown in FIGS. 1–5.

The bottom of the body 12 is closed off with a bottom wall 18, formed with many through perforations 20. The bottom wall 20 is bulged downwardly to have convex shape as seen in FIGS. 3 and 6.

Also provided are a series of circumferentially spaced slots 22 each extending axially down a portion of the height of the side wall of body 12 and through the outer perimeter of the bottom wall 18.

Figure 4:
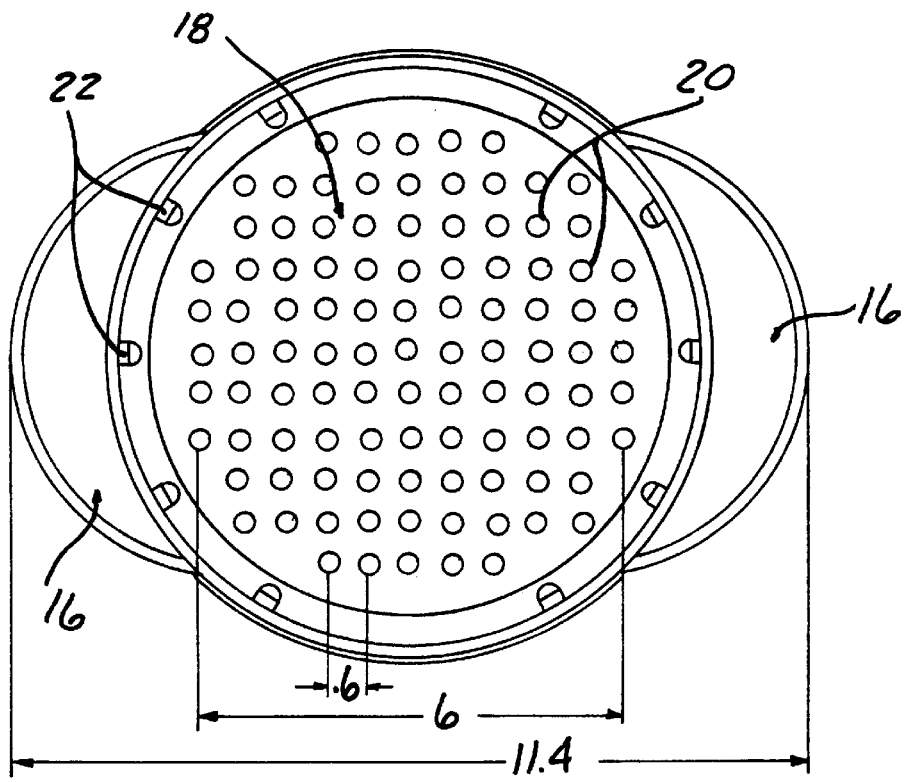
FIG. 4 is a bottom view of the strainer shown in FIGS. 1–3.
Figure 5:
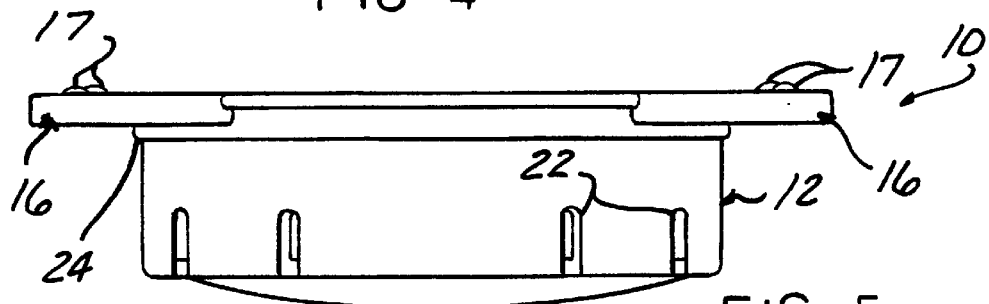
FIG. 5 is a front elevational view of the strainer shown in FIGS. 1–4.

The outside diameter of the strainer body 12 is of a size to be slidably fit within an opened standard tuna fish can. FIGS. 3, 4, and 5 are dimensioned in centimeters, and the diameter of the actual embodiment shown is 8.2 cm, as indicated.

A shoulder 24 is formed by a slightly larger diameter of the body 12 at an axial location just beneath the flange 14.

This shoulder has a diameter (8.55 cm in the illustrated embodiment) greater than the inside diameter of a standard tuna fish can so as to limit the distance that the strainer body 12 can enter a tuna can when used to drain tuna, as will be described herein.

The inside diameter of the strainer body 12 is sized so that soup cans, kidney bean cans, etc. received into the strainer body 12 to rest on the bottom wall 18 when inverted for draining. In the illustrated embodiment, this diameter is 7.7 cm as indicated.

A step 26 on the inside is of increased diameter, i.e., 8.01 cm, in order to accommodate larger cans, which are supported spaced above the bottom wall 18.

Figure 7:
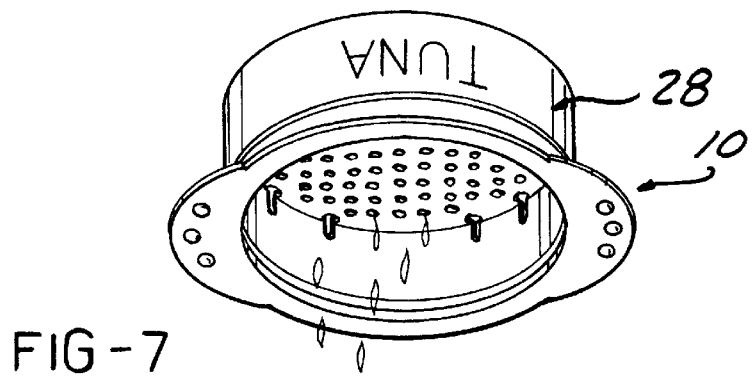
FIG. 7 is a perspective view of the strainer according to the invention in use to compress the tuna meat in an opened can of tuna.
Figure 8:
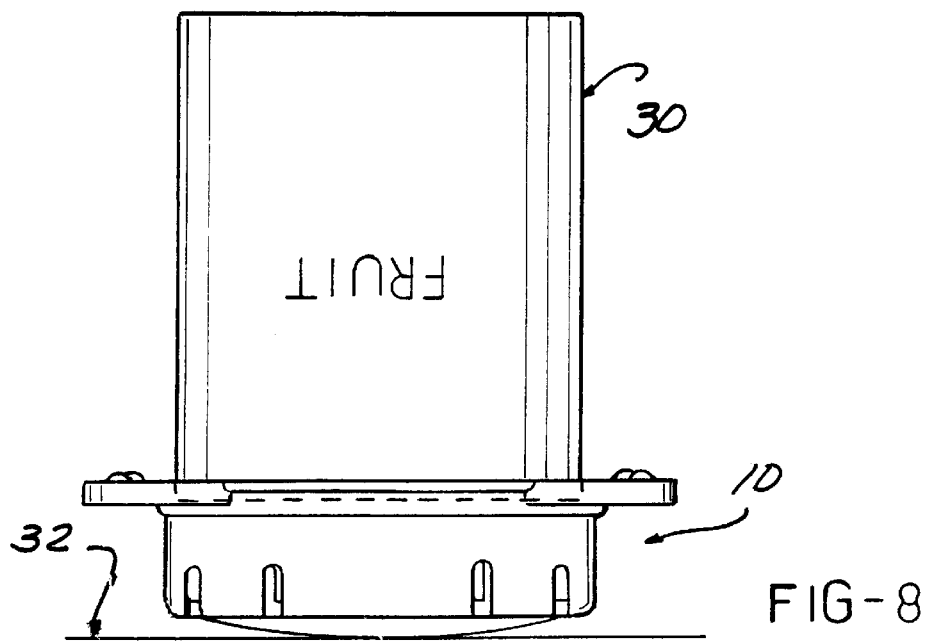
FIG. 8 is a side elevational view of the strainer in position over an inverted opened can being drained through the strainer.

FIG. 7 shows the strainer in use to remove the liquid from the tuna meat in an opened can of tuna fish 28. This involves pushing the bottom wall 18 into the interior of the open top of the can 28. The can 28 is then held inverted with the fingers and the strainer 10 pushed with the thumbs acting on the flange ears 16 as shown.

This causes the liquid to be expressed out of the tuna meat and through the side wall slots 22 and perforations 20, and thereafter out of the strainer body 12. The convex curvature of the bottom wall 18 tends to force the liquid outwardly to the slots 22 so that liquid is expressed out of both slots 22 and the perforations 20.

With other cans, the strainer body 12 is placed over the open top end of the can 30 as shown in FIG. 7, and both are then inverted. The liquid in the can drains out through the perforations 20 and slots 22. The curvature keeps the perforations open when the strainer body is rested on a surface 32, as a sink bottom, as the liquid is drained.

I claim:

1. A strainer device for assisting in draining packing liquid from canned food, said device comprising:
    a hollow cylindrical strainer body open at the top end and closed at the bottom end with a bottom wall, said bottom wall having a number of through perforations formed therein;
    a series of through slots formed in said strainer body arranged about the perimeter thereof, each of said slots extending from an intermediate location on the height of said strainer body downwardly through a perimeter of said bottom wall;
    a pair of protuberances each extending out from a rim of said strainer body top end at diametrically opposite locations;
    said strainer body having a diameter such as to slidably fit said strainer body into an opened standard tuna fish can.

2. The strainer device according to claim 1 wherein said strainer body has a diameter approximately 8.2 cm.

3. The strainer device according to claim 1 wherein said strainer body has a stepped inside diameter sized to receive cans of smaller diameter than a standard tuna fish can.

4. The strainer device according to claim 1 wherein said bottom wall is bulged downwardly to create a convex shape allowing resting of said strainer body on a surface without blocking all of said perforations to allow draining of liquid from a can while resting on said surface.

5. The strainer device according to claim 1 further including a series of antislip protrusions formed on the surface of each of said protuberances.

6. The strainer device according to claim 1 further including a flange formed around said strainer body top rim, said protuberances comprising enlarged flange ears extending radially outward from said flange.

7. The strainer device according to claim 1 further including a downwardly protruding ridge formed along a perimeter edge of each of said protuberances.

8. The strainer device according to claim 6 wherein each of said flange ears comprises a crescent-shaped section extending out from said flange with an outer convex perimeter shape.

9. The strainer device according to claim 1 wherein said strainer body is approximately 2.3 cm high.

10. A strainer device for assisting in draining packing liquid from a can of food, said device comprising:
    a hollow, straight sided cylindrical strainer body open at the top end and closed at the bottom end with a bottom wall, said bottom wall having a number of through perforations formed therein;
    said strainer body having a diameter such as to slidably fit said strainer body over an opened standard food can;
    said bottom wall bulged downwardly to create a convex shape allowing resting of said strainer body on a surface without blocking all of said perforations to allow draining of liquid from said can while said bottom wall is resting on said surface.

11. A strainer device for assisting in draining packing liquid from a can of food, said device comprising:
    a hollow, straight sided cylindrical strainer body open at the top end and closed at the bottom end with a bottom wall, said bottom wall having a number of through perforations formed therein;
    said strainer body having a diameter such as to slidably fit said strainer body into an opened standard tuna fish can;
    a pair of protuberances extending out from said top end, and a series of through slots formed in said strainer body arranged about the perimeter thereof, each of said slots extending from an intermediate location on the height of said strainer body downwardly through a perimeter of said bottom wall, said bottom wall having a downwardly bulged convex shape, said convex shape of said bottom wall forcing packing liquid towards said slots when said strainer body is pushed into the open end of a can of tuna by pressing on said protuberances.

\* \* \* \* \*